United States Patent [19]

Beeson et al.

[11] Patent Number: 5,761,956
[45] Date of Patent: Jun. 9, 1998

[54] PASSIVE COMBUSTION TURBINE BLADE VIBRATION MONITOR SENSOR

[75] Inventors: Robert J. Beeson; Michael Twerdochlib, both of Oviedo; Jeffrey Arthur Kain, Chuluota, all of Fla.

[73] Assignee: Westinghouse Electric Corporation, Pittsburgh, Pa.

[21] Appl. No.: 544,347

[22] Filed: Oct. 17, 1995

[51] Int. Cl.[6] .................................................... G01M 13/00
[52] U.S. Cl. .................................................... 73/660; 73/655
[58] Field of Search ............................ 73/660, 661, 866, 73/655, 657, 653

[56] References Cited

U.S. PATENT DOCUMENTS

| | | | |
|---|---|---|---|
| 4,334,777 | 6/1982 | Bien | 73/657 |
| 4,408,827 | 10/1983 | Guthrie et al. | |
| 4,573,358 | 3/1986 | Luongo et al. | |
| 4,757,717 | 7/1988 | Wolfinger et al. | |
| 4,887,468 | 12/1989 | McKenoree | 73/660 |
| 4,896,537 | 1/1990 | Osborne | 73/660 |
| 4,914,953 | 4/1990 | Viscovich et al. | |
| 4,922,757 | 5/1990 | Rozelle et al. | |
| 5,063,781 | 11/1991 | Conforti | 73/653 |
| 5,097,711 | 3/1992 | Rozell | 73/660 |
| 5,148,711 | 9/1992 | Twerdochlib | 73/660 |
| 5,201,227 | 4/1993 | Inuma | 73/655 |
| 5,511,426 | 4/1996 | Clement | 73/655 |

OTHER PUBLICATIONS

Andrenelli, L. et al., "Large–Bandwidth Reflection Fiber–Optic Sensors for Turbomachinery Rotor Blade Diagnostics," Sensors and Actuators A, vol. A32, No. 1/03, 1 Apr. 1992.

*Primary Examiner*—Christine K. Oda
*Attorney, Agent, or Firm*—D. G. Maire

[57] ABSTRACT

A passive blade vibration monitor sensor for determining an arrival time of a blade of a combustion turbine during operation, the sensor includes an optical lens which receives infrared radiation generated by the blade of the turbine and generates a sensor signal from the received infrared radiation, the sensor signal indicating an arrival time of the blade of the combustion turbine. Target material having an emissivity lower than the emissivity of the blade may be placed on the blade to enhance sensor sensitivity especially in shrouded blade environments.

12 Claims, 3 Drawing Sheets

1

PASSIVE COMBUSTION TURBINE BLADE VIBRATION MONITOR SENSOR

FIELD OF THE INVENTION

The present invention relates to sensors used to monitor the vibration of turbine rotor blades, and in particular, combustion turbine blades.

BACKGROUND OF THE INVENTION

Turbine systems, such as those shown in FIGS. 1A and 1B, employ a pressurized low density gas to provide mechanical energy to blades 34 of a rotor. As the pressurized gas is expanded in a turbine, the rotor generates mechanical energy in the form of torque on a shaft of the rotor via the blades 34 of the turbine rotor. Common gases used in turbine systems include atmospheric air (mainly nitrogen) and steam ($H_2O$).

In combustion turbines, 10 and 20, high pressure ("HP") gas is heated by the combustion of fuel 32 before the entry of the gas into the turbine rotor section. As a consequence, the temperature of the HP gas is greatly elevated prior to passage along blades 34 of a rotor of a turbine 20. For example, the turbine 20 shown in FIG. 1B has an eight stage axial compressor, combustion chamber, and three stage axial flow turbine. In this turbine 20, air is drawn in an air inlet 22 and compressed by the stator blades 24 and compressor blades 26. The compressed, HP air is heated in the combustion chamber 28 where fuel is added at the fuel inlet 32. The HP, high temperature air is passed along the blades 34 of the turbine causing rotation of the shaft 38 of the turbine. Finally, the lower pressure, lower temperature air (gas) passes into the turbine exhaust 36.

In turbine 20, the air is heated to about 843° C. prior to passage along the blades 34 of the turbine. During the normal operation of this turbine 20, the speed of the shaft 38 of the turbine 20 is approximately 22,300 revolutions per minute ("RPM"). In commercial combustion turbines used for large scale power generation, the speed of the shafts of the turbines during normal operation is approximately 3,600 RPM. Due to the extreme conditions placed on a turbine during normal loading, in particular, the extreme stress placed on the turbine blades 34 which provide the fulcrum for the rotation of the shaft 38 of a turbine, systems have been developed to monitor the status of blades of a turbine rotor. In particular, blade vibration monitors ("BVM") have been developed to determine vibration levels of blades of turbine rotors during operation. See, for example, the BVM described in commonly assigned U.S. Pat. Nos. 4,573,358, 4,757,717, 4,922,757, 5,148,711, 4,887,468, and 4,896,537.

To determine the vibration level of turbine blades, BVM sensors measure blade arrival times for a row of blades. For example, turbine 20 has three rows of blades 34 and, thus, one or more BVM sensors may be used to measure the blade arrival times for each row of blades. Based on the number of blades on a turbine rotor and the shaft rotation speed, exact blade arrival times can be determined. If the measured arrival time of a blade is early or late as compared to the expected arrival time, then the blade must be vibrating, i.e., the blade is displaced from its normal/nominal position due to vibration.

To measure the arrival time of a turbine rotor blade, BVM systems utilize sensors which generate a signal representative of the arrival time of a blade. The sensor signal is further processed by BVM sensor signal conditioning equipment which generates a pulse signal having logical pulses representing the arrival times of blade. The logical pulse signal is evaluated by BVM interpretation equipment which determines the vibration level of the blade.

Known BVM sensors include electrical, laser-based, microwave, acoustic, and capacitive sensors. Each of these known sensors, however, is not desirable for use in combustion turbine ("CT") environments. In particular, electrical sensors measure blade arrival times by detecting changes in magnetic environment near the sensor as blades pass very close. Electrical sensors include reluctance sensors and eddy current sensors. Reluctance sensors utilize a coil and a permanent magnet to detect changes in reluctance where the change in reluctance indicates the arrival of a blade. Eddy current sensors utilize an active coil which induces eddy currents on the surfacer of blades to determine the arrival of the blades.

These electrical sensors are not acceptable in the high temperature environment of combustion turbines because the copper wire of the sensors can not withstand the high temperature without expensive ceramic coating. In addition, magnets fail in reluctance due to high temperature. In addition, these sensors have limited bandwidths, especially the eddy current sensors, and, thus, the accuracy of the measurements generated by these sensors is limited.

Laser based sensors employ two systems to determine or measure the arrival times of a row of blades. One of the two systems includes a fiber optic cable having an end inserted in the turbine near the area of rotation of a row of blades. The other end of the fiber optic cable is attached to a laser. The fiber optic cable directs a laser beam generated by the laser onto the tips or faces of the row of blades. A second system of the laser based sensor includes a photodetector which is also placed in the turbine near the area of rotation of the row of blades. The second system focuses the reflections of the radiation of the beam generated by the laser off the row of blades onto the photodetector. The photodetector generates a signal indicating blade arrival or passing times based on the focused reflections of the beam.

Laser based sensors are also unacceptable in combustion turbine environments. First, laser systems are very sensitive to ambient temperature and thus have a limited long term application in combustion turbine environments. In addition, laser based sensors are expensive. The installation and maintenance of a laser based system is labor intensive, i.e., the initial setup and maintenance of the critical optical alignment between the laser and the fiber optics. Finally, in order to measure arrival times for more than one row of blades, multiple lasers or a complex optical multiplexing element are needed.

Acoustic sensors utilize transducers to measure the sound waves generated downstream by blades passing through gas expanding in a turbine. Acoustic sensors are also unacceptable in combustion turbine environments. Commercial transducers can not withstand the high temperature environment of combustion turbines. In addition, the sound waves generated by the blades are sensitive to the temperature of the turbine and load on the blades. Finally, acoustic sensors can not actually determine blade displacement from the sound waves generated by the blades of the turbine.

As a consequence, a need exists for an accurate, inexpensive, BVM sensor which can withstand the environment of combustion turbines. In detail, the sensor must be capable of measuring blade arrival times of turbines whose shaft rotation speed may range from 3,600 RPM to 22,300 RPM.

SUMMARY OF THE INVENTION

An object of the present invention is to provide an accurate, inexpensive, BVM sensor which can withstand the environment of combustion turbines. In an exemplary embodiment, the BVM sensor includes an optical lens. The optical lens is configured to receive infrared radiation generated by a blade of a turbine. The optical lens generates a sensor signal representative of an arrival time of the blade based on the received infrared radiation. The optical lens may also be configured to receive infrared radiation generated by a blade and target material on a tip of the blade of a turbine. Again, the optical lens generates a sensor signal representative of an arrival time of the blade. In this configuration, however, the signal is based on the infrared radiation generated by the blade and the target material on the tip of the blade. Ideally, the blade has a first emissivity and the target material has a second emissivity significantly different than the first emissivity of the blade. In addition, ideally the target material is a thermal barrier ceramic consisting essentially of eight percent Yttria stabilized Zirconia. There may also be layer of MCrAlY between the target material and tip of the blade to facilitate proper bonding.

In another embodiment of the invention, the sensor is configured to receive infrared radiation generated by a plurality of blades of a turbine. In this configuration, the sensor generates a sensor signal representative of the arrival times of the plurality of blades based on the received infrared radiation.

The optical lens used in any embodiment of the invention may be a discrete or gradient index lens. In addition, the optical lens may be coupled to a fiber optic cable. Finally, several optical lenses may be used to determine arrival times of blades associated with different rows of a combustion turbine.

DETAILED DESCRIPTION OF THE PREFERRED EMBODIMENTS

Figure 1A:
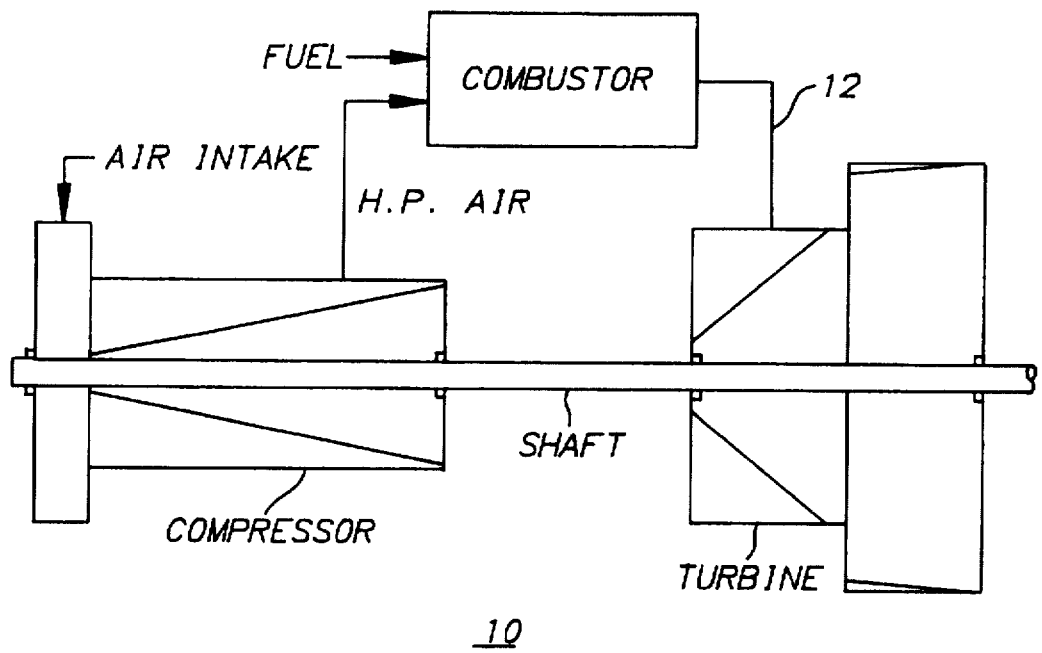
FIG. 1A (Prior Art) is a diagram of combustion turbine system.
Figure 2:
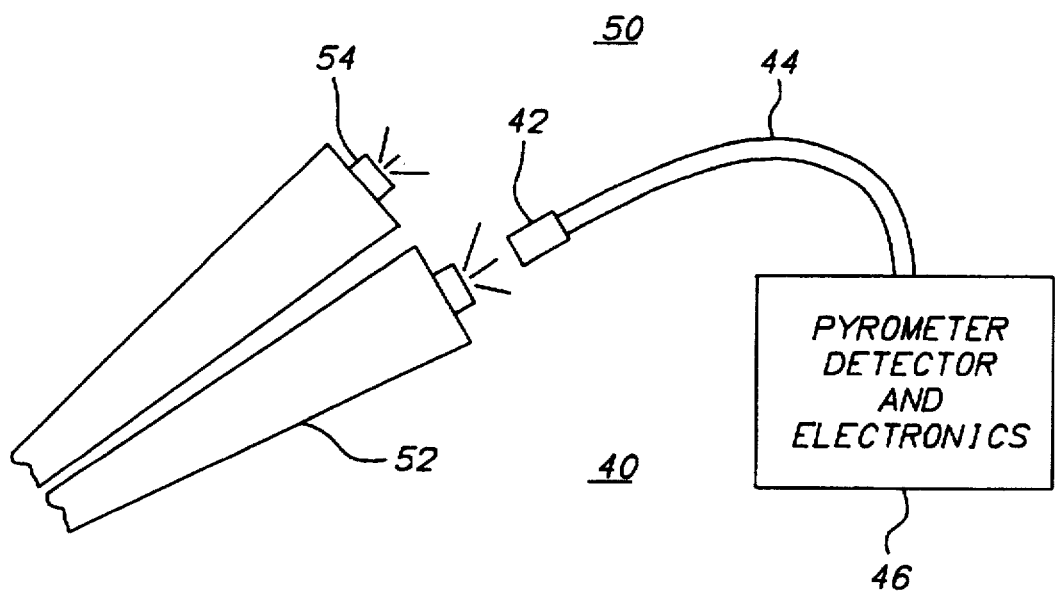
FIG. 2 is an exemplary embodiment of a BVM system according to the present invention.
Figure 1B:
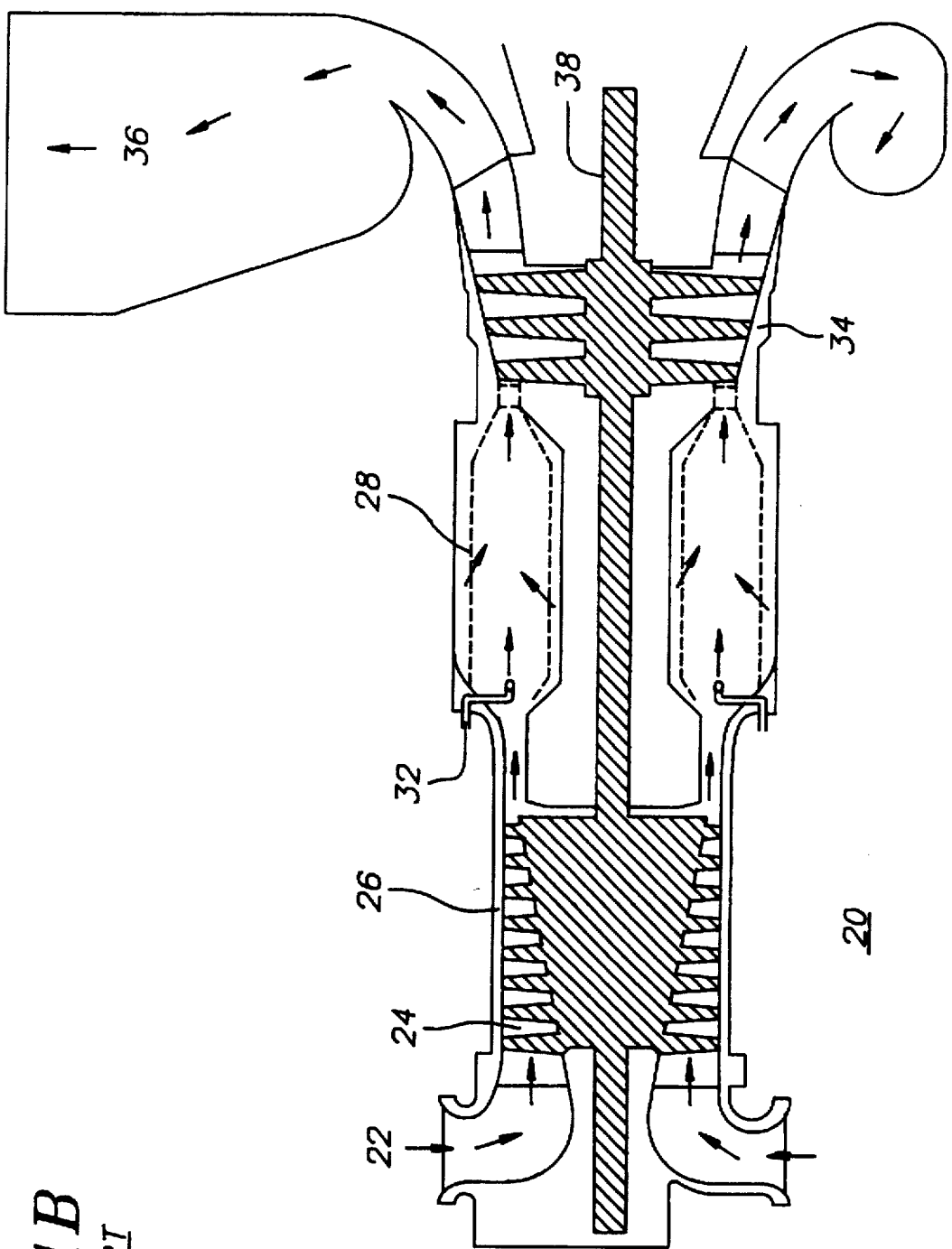
FIG. 1B (Prior Art) is a cross-sectional view of a combustion turbine system.

FIG. 2 illustrates a BVM system 40 according to the present invention. The system 40 includes a BVM sensor 50 and BVM sensor signal conditioning equipment 46. A signal generated by the conditioning equipment 46 is processed by known BVM interpretation equipment (not shown) to generate vibration levels. In the exemplary embodiment of the invention, the BVM sensor 50 includes an optical focusing lens 42 and fiber optic cable 44 coupled to the focusing lens 42. This exemplary embodiment of the BVM sensor 50 also includes passive light-emitting targets 54 with an emissivity significantly different than the blade material attached to blade tips 52. In the exemplary body of the invention, the targets 54 emit less infrared radiation than the blades 52.

As noted above, in a combustion turbine high temperature, HP gas is passed over the blades of a turbine rotor. In the exemplary embodiment of the invention, the gas heats up both the blades 52 and targets 54 affixed to the blades. Both the targets 54 and blades 52 emit infrared radiation of a predictable power spectrum based on their ambient temperature and material composition. The optical lens 42 is oriented along a row of blades in a turbine. As a blade 52 with a target 54 passes the optical lens 42, the blade 52 and target 54 emit infrared radiation of a different intensity due to their differing emissivity. The optical lens 42 is configured to transmit the radiation produced by the blade 52 and target 54.

In particular, the optical lens 42 is configured so that enough radiation is received from the blade 52 and target 54 to ensure accurate arrival time measurement. In addition, the optical lens 42 is configured so that only one blade 52 and target 54 is in the field of view of the lens at any time. As noted above, in the exemplary embodiment, the lens is configured to transmit the infrared radiation produced by the blades 52 and targets 54. In another embodiment, the optical lens 42 may be configured to transmit the infrared radiation only generated by the tips of the blades 52 of a turbine rotor, thus, eliminating the need for targets 54. In the exemplary embodiment of the invention, the optical lens 42 may be a discrete or gradient index lens. Regardless, the optical lens 42 couples the infrared radiation emitted from either the hot turbine blade 52 tips or combination of blade 52 tips and target material 54 into the optical fiber 44.

Figure 3A:
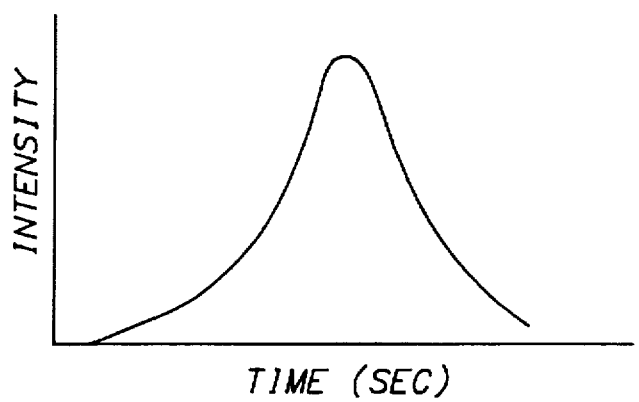
FIG. 3A is a graph of a signal generated by an exemplary BVM sensor from infrared radiation emitted from a blade without target material according to the present invention.

FIG. 3A is a diagram of the optical signal produced by the optical lens 42 when a hot blade tip without target material passes into the field of view of the lens. The peak or center portion of the signal indicates when the blade 52 tip is centered in the field of view of the lens 42. As the temperature of the blades 52 increases, the energy level of its radiation also increases. As a consequence, the BVM sensor 42 will generate sensor signals with greater intensity and, thus, accuracy, as the temperature of the turbine system increases. Combustion turbines blades are commonly manufactured from a nickel based material which has a relatively high emissivity. The emissivity is approximately 0.7 to 0.8 on a scale from 0.0 to 1.0. Thus, the blades 52 will emit a relatively high level of radiant thermal energy for a given temperature.

In combustion turbine systems with tip shrouded turbine blades 52, a piecewise continuous outer shroud ring is typically formed by shroud segments at the tip of each blade. Unlike freestanding turbine blades, this outer shroud ring may not have sufficient geometrical discontinuities corresponding to each individual blade which are needed to produce a measurable change in infrared radiation each time a blade passses a sensor 42. In order to facilitate BVM detection of such tip shrouded turbine blade configurations, a target 54, made from material possessing a measurably different emissivity from that of the outer shroud segment, is applied to the outer shroud segment of each blade.

Figure 3B:
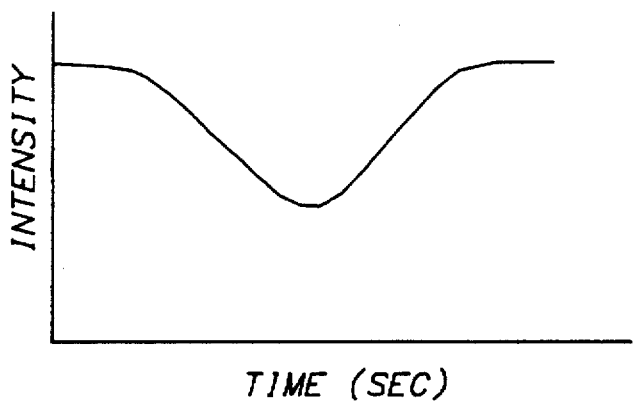
FIG. 3B is a graph of a signal generated by an exemplary BVM sensor from infrared radiation emitted from a blade with target material according to the present invention.

As noted above, combustion turbine blades have a relatively high emissivity. Therefore, target material 54 with an emissivity significantly lower than the emissivity of the blades 52 is selected in order to generate a measurably different emissivity as each blade 52 passes the sensor 42. In operation, when a blade tip 52 with target material 54 passes the sensor 42 of the invention, a reduced level of infrared radiation is received and the reduction is used to determine or indicate the arrival or passing of a turbine blade 52. FIG. 3B is a diagram of an optical signal produced by the optical lens 42 when a hot blade tip 52 with a target material 54 having an emissivity lower than the emissivity of the blade 52 (and shroud) passes into the field of view of the lens. The valley of the signal indicates when the target material 54 on the blade tip 52 is centered in the field of view of the lens 42. As the temperature of the combustion turbine increases, the difference between the energy level of radiation emitted by the target material 54 and the remainder of the system (blades tips and shrouding) increases. As a consequence, the BVM sensor 42 will generate sensor signals with greater accuracy as the temperature of the turbine system increases. It is noted that target material 54 may also be used in combustion turbine systems without shrouded blades. A signal similar to the signal shown in FIG. 3B would be generated by a non-shrouded turbine blade system due to the difference in emissivity between the blade tips 52 of the system and target material 54.

In the preferred embodiment of the invention, the target material 54 is thermal barrier ceramic ("TBC") which is coated on tips of blades 52. The TBC is placed on an appropriate surface of each blade tip 52 to be monitored. A preferred TBC is an eight percent Yttria stabilized Zirconia. In addition, a coating of MCrAlY is preferably placed between the eight percent Yttria stabilized Zirconia and blade surface 52 to facilitate proper bonding between surface of the blade tip 52 and TBC. The TBC has an emissivity of about 0.4%. As noted above, nickel based metal has an emissivity of about 0.7 to 0.8%. This differential in emissivity ( 0.4% versus 0.7 to 0.8%) is the source of the valley shown in FIG. 3B.

The sensor signal or optical signal generated by the optical lens 42 (such as shown in FIGS. 3A and 3B) and coupled into the fiber optic cable 44 is processed by BVM sensor signal conditioning equipment 46 and BVM interpretation equipment. The BVM sensor signal conditioning equipment 46 and BVM interpretation equipment may be any type of known processing circuitry capable of extracting vibration information from an input signal representative of blade passing events as disclosed, for example, in the above mentioned U.S. Pat. Nos. 4,573,358, 4,757,717, 4,922,757, 5,148,711, 4,887,468, and 4,896,537.

Note, the BVM sensor 42 may also be used to generate other information, such as the temperature of the blade and target material, based upon the intensity of the sensor signal. Due to the use of the fiber optic cable 44, the BVM sensor signal conditioning equipment 46 and BVM interpretation equipment may be positioned far from the hot temperature environment of the combustion turbine. Thus, the BVM sensor 42 of the present invention helps prevent damage to and permits easy repair of the BVM sensor signal conditioning equipment 46 and BVM interpretation equipment.

Figure 3C:
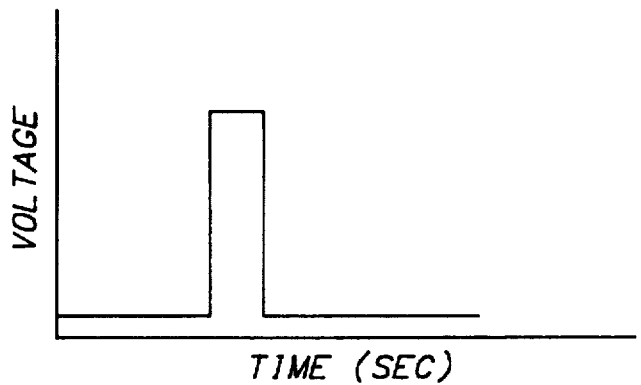
FIG. 3C is a graph of a signal generated by exemplary BVM sensor signal conditioning equipment according to the present invention.

As noted earlier, the BVM sensor signal conditioning equipment 46 converts the sensor signal into a logical pulse signal. As described in U.S. Pat. No. 5,148,711, a turbine blade vibration monitor sensor produces a signal indicative of the actual arrival time of each turbine blade in the sensor. A first circuit is responsive to the sensor for producing digital data representing the actual arrival time of each turbine blade at the sensor. A second circuit establishes an expected arrival time for each turbine blade at the sensor. A third circuit is responsive to the digital data for generating a plurality of data entries, each data entry representing the difference between the actual arrival time and the expected arrival time of one of the turbine blades in the sensor. A fourth circuit stores the data entries in a first string. The first string has a plurality of dummy entries at the beginning thereof and at the end thereof for the purpose of simplifying the algorithm needed to calculate a running average. The fourth circuit also inserts into the first string space over characters in the event that the data entry for a blade is not produced. A fifth circuit establishes a running average value over a plurality of data entries for each data entry. The running average value is representative of the vibration common to all of the turbine blades, i.e. representative of common mode vibration. A sixth circuit abstracts each of the average values from its corresponding data entry in the first string to produce a second string wherein the entries in the second string are free of common mode vibration data. The logical pulse signal is compatible with standard BVM interpretation equipment (such as equipment described in the above incorporated patents) where the standard BVM interpretation equipment generates vibration levels based upon the logical pulse signal. In the preferred embodiment of the invention, the BVM sensor signal conditioning equipment 46 includes a pyrometer. The pyrometer replaces zero crossing detectors used in known signal conditioning equipment, such as the equipment described in the incorporated patents. The pyrometer could also be replaced with a reference level detector as described in the incorporated patents. The signal conditioning equipment 46, thus, acts as a transducer taking infrared pulses generated by the BVM sensor 50 and generating logical pulse signals. In systems employing target material 54, the BVM sensor signal conditioning equipment 46 generates a logic pulse signal for each valley in the signal. FIG. 3C is a graph of a logic pulse signal generated by BVM sensor signal conditioning equipment 46 according to the present invention.

For systems not employing target material 54, the pulse is centered on the rising edge of the sensor signal (such as shown in FIG. 3A). The pulse indicates the exact time arrival of a blade tip 52. For systems employing target material 54, the pulse is centered at the falling edge of the sensor signal (such as shown in FIG. 3B). The pulse thus indicates the exact time arrival of target material 54 on a blade tip 52. A string or time series of the logic pulses are processed by BVM interpretation equipment to determine the vibration levels of blades of the system.

As noted above, a turbine system may have more than one row of blades. In the present invention, a separate optical lens 42 coupled to a fiber optic cable 44 may be aligned over each of the rows of blades of a turbine. One or multiple BVM sensor signal conditioning equipment 46 may be used to generate logic pulse signals for each of the rows of blades. Then, standard BVM interpretation equipment may be used to determine the vibration levels of each row of blades of a turbine system.

Although the invention has been described in terms of an exemplary embodiment, the spirit and scope of the appended claims are unlimited by any details not expressly stated in the claims.

What is claimed is:

1. A blade vibration monitor (BVM) sensor for generating a sensor signal representative of an arrival time of a blade of a turbine rotor during the rotation of the turbine, the BVM sensor comprising an optical lens configured to receive infrared radiation generated by the blade of the turbine rotor and to generated the sensor signal representative of the arrival time of the blade based on the infrared radiation, wherein the optical lens is configured to receive infrared radiation generated by the blade and target material on a tip of the blade of the turbine rotor and to generate the sensor signal representative of the arrival time of the blade based on the infrared radiation generated by the blade and the target material.

2. A blade vibration monitor (BVM) sensor according to claim 1, wherein the optical lens is one of a discrete lens and a gradient index lens.

3. A blade vibration monitor (BVM) sensor according to claim 1, further comprising a fiber optic cable coupled to the optical lens and signal conditioning equipment coupled to the fiber optic cable.

4. A blade vibration monitor (BVM) sensor for generating a sensor signal representative of an arrival time of a blade of a turbine rotor during the rotation of the turbine, the blade having a first emissivity and the BVM sensor comprising:

target material on a tip of the blade, the target material having a second emissivity lower than the first emissivity of the blade; and an optical lens configured to receive infrared radiation generated by the blade and the target material on the tip of the blade of the turbine rotor and to generate the sensor signal representative of the arrival time of the blade based on the infrared radiation generated by the blade and the target material.

5. A blade vibration monitor (BVM) sensor according to claim 4, wherein the target material is a thermal barrier ceramic.

6. A blade vibration monitor (BVM) sensor according to claim 5, wherein the target material consists essentially of about eight percent Yttria stabilized Zirconia.

7. A blade vibration monitor (BVM) sensor according to claim 6, further comprising a layer of MCrAlY beneath the layer of target material on the tip of the blade.

8. A blade vibration monitor (BVM) sensor for generating a sensor signal representative of an arrival time of a blade of a turbine rotor during the rotation of the turbine, the blade having a first emissivity and the BVM sensor comprising:

target material consisting essentially of about eight percent Yttria stabilized Zirconia on a tip of the blade, the target material having a second emissivity lower than the first emissivity of the blade;

a layer of MCrAlY beneath the layer of target material on the tip of the blade;

an optical lens configured to receive infrared radiation generated by the blade and the target material on the tip of the blade of the turbine rotor and to generate the sensor signal representative of the arrival time of the blade based on the infrared radiation generated by the blade and the target material, wherein the optical lens is one of a discrete lens and a gradient index lens;

a fiber optic cable coupled to the optical lens; and signal conditioning equipment coupled to the fiber optic cable.

9. A blade vibration monitoring sensor comprising a first material of a blade in a turbine, said first material emitting infrared radiation at a first predetermined intensity, a lens for receiving said emitted infrared radiation as said blade passes near said lens, an optical fiber connected to said lens for transmitting said received emitted infrared radiation, and signal conditioning equipment connected to said optical fiber for receiving said received emitted infrared radiation and for converting changes in said received emitted infrared radiation to a signal representative of an arrival time of said blade.

10. The blade vibration monitoring sensor of claim 9, further comprising a target material located on said blade, said target material emitting infrared radiation at a second predetermined intensity different than said first predetermined intensity, and wherein said signal conditioning equipment is operable to generate said signal in response to the difference in said first and said second predetermined intensities.

11. The blade vibration monitoring sensor of claim 10, further comprising said target material being a thermal barrier ceramic.

12. The blade vibration monitoring sensor of claim 11, further comprising said target material consisting essentially of about eight percent yttria stabilized zirconia.

* * * * *